United States Patent
Yan et al.

(10) Patent No.: US 11,693,752 B2
(45) Date of Patent: Jul. 4, 2023

(54) MEASURING DRIVING MODEL COVERAGE BY MICROSCOPE DRIVING MODEL KNOWLEDGE

(71) Applicant: INTERNATIONAL BUSINESS MACHINES CORPORATION, Armonk, NY (US)

(72) Inventors: Zhanhong Yan, Setagaya-ku (JP); Satoshi Masuda, Nerima-ku (JP); Michiaki Tatsubori, Oiso (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/476,049

(22) Filed: Sep. 15, 2021

(65) Prior Publication Data

US 2023/0081687 A1 Mar. 16, 2023

(51) Int. Cl.
*G06F 11/263* (2006.01)
*B60W 40/06* (2012.01)
(Continued)

(52) U.S. Cl.
CPC ......... *G06F 11/2635* (2013.01); *B60W 40/06* (2013.01); *B60W 50/14* (2013.01);
(Continued)

(58) Field of Classification Search
None
See application file for complete search history.

(56) References Cited

U.S. PATENT DOCUMENTS 7,925,397 B2 * 4/2011 Underdal ............... G06N 5/022
701/33.4
8,428,813 B2 * 4/2013 Gilbert ..................... G06N 5/04
701/31.4
(Continued)

FOREIGN PATENT DOCUMENTS

CN 109753623 A * 5/2019
CN 109753623 B * 5/2020
(Continued)

OTHER PUBLICATIONS

Kirovskii, O M, et al. "Driver assistance systems: analysis, tests and the safety case. ISO 26262 and ISO PAS 21448", InIOP Conference Series: Materials Science and Engineering, vol. 534, No. 1, IOP Publishing. May 1, 2019, pp. 1-12.
(Continued)

*Primary Examiner* — Kevin R Steckbauer
(74) *Attorney, Agent, or Firm* — Tutunjian & Bitetto, P.C.; Randy Emilio Tejeda

(57) ABSTRACT

A computer-implemented method is provided for redundancy reduction for driving test scenarios. The method includes receiving an original test set of driving scenarios and a driving model which simulates a vehicle behavior under a driving scenario inputted to the driving model. The method includes, for each driving scenario of the original test set, obtaining vehicle dynamics timeseries data as an output of the driving model. The method includes determining similar driving scenarios by comparing driving model outputs. The method additionally includes creating a new test set of driving scenarios by discarding duplicated ones of the similar driving scenarios from the original test set.

20 Claims, 7 Drawing Sheets

(51) Int. Cl.
| | |
|---|---|
| *G06V 20/56* | (2022.01) |
| *B60W 50/14* | (2020.01) |
| *G06F 11/22* | (2006.01) |
| *G06F 11/267* | (2006.01) |
| *B60W 50/02* | (2012.01) |

(52) U.S. Cl.
CPC ........ *G06F 11/2273* (2013.01); *G06F 11/263* (2013.01); *G06F 11/267* (2013.01); *G06V 20/56* (2022.01); *B60W 50/02* (2013.01); *B60W 50/0205* (2013.01); *B60W 2050/021* (2013.01); *G06F 11/2257* (2013.01)

(56) References Cited

U.S. PATENT DOCUMENTS

| | | | | |
|---|---|---|---|---|
| 11,030,832 | B2* | 6/2021 | Kang | G07C 5/008 |
| 2007/0293998 | A1* | 12/2007 | Underdal | G06N 5/02 |
| | | | | 702/183 |
| 2007/0293999 | A1* | 12/2007 | Underdal | G06N 5/022 |
| | | | | 701/32.8 |
| 2009/0216493 | A1* | 8/2009 | Underdal | G06Q 10/06 |
| | | | | 702/183 |
| 2010/0010702 | A1* | 1/2010 | Gilbert | G06N 5/04 |
| | | | | 701/31.4 |
| 2020/0193738 | A1* | 6/2020 | Kang | B60R 16/0232 |
| 2021/0009156 | A1* | 1/2021 | Hu | G06V 20/56 |
| 2021/0122383 | A1* | 4/2021 | Yi | B60W 60/0015 |
| 2021/0197851 | A1* | 7/2021 | Jin | B60W 60/001 |
| 2023/0081687 | A1* | 3/2023 | Yan | G06V 20/56 |

FOREIGN PATENT DOCUMENTS

| | | | | |
|---|---|---|---|---|
| CN | 112382121 | A * | 2/2021 | |
| EP | 1868144 | A1 * | 12/2007 | ............. G06N 5/022 |
| EP | 3722907 | A1 | 10/2020 | |

OTHER PUBLICATIONS

Wang, Zheng, et al. "Comfort-oriented haptic guidance steering via deep reinforcement learning for individualized ane keeping assist", In2019 IEEE International Conference on Systems, Man and Cybernetics (SMC). Oct. 6, 2019, pp. 4283-4289.

Wang, Zheng, et al. "Relationship between gaze behavior and steering performance for driver-automation shared control: a driving simulator study", IEEE Transactions on Intelligent Vehicles, vol. 4, No. Mar. 1, 2019, pp. 154-166.

Song, Jie, et al. "Research on car-following model based on SUMO", Inthe 7th IEEE/International Conference on Advanced Infocomm Technology. Nov. 14, 2014, pp. 47-55.

Madlenak, Radovan, et al. "The analysis of the traffic signs visibility during night driving", Advances in Science and Technology Research Journal, vol. 12, No. Jun. 2, 2018, pp. 71-76.

Rasmussen, Roy M., et al. "The estimation of snowfall rate using visibility", Journal of Applied Meteorology and Climatology, vol. 38. Oct. 1, 1999, pp. 1542-1563.

Yekhshatyan, Lora, et al. "Changes in the correlation between eye and steering movements indicate driver distraction", IEEE Transactions on Intelligent Transportation Systems, vol. 14, No. 1. Mar. 2013, pp. 136-145.

Chattington, M., et al. "Eye-steering coordination in natural driving", Experimental brain research, Springer-Verlag 2007. Jan. 26, 2007, pp. 1-14.

Miall, R. C., et al. "The cerebellum and the timing of coordinated eye and hand tracking", Brain and cognition. Aug. 13, 2001, pp. 212-226.

Ma, Chao, et al. "A method for lane detection based on color clustering", In2010 Third International Conference on Knowledge Discovery and Data Mining. Jan. 9, 2010, pp. 200-203.

Leonhardt, Veit, et al. "Feature evaluation for lane change prediction based on driving situation and driver behavior", In2017 20th International Conference on Information Fusion (Fusion). Jul. 10, 2017, pp. 1-7.

Kordani, Ali Abdi, et al. "Effect of adverse weather conditions on vehicle braking distance of highways", Civil Engineering Journal, vol. 4, No. 1. Jan. 2018, pp. 46-57.

Anonymous. "Interstate 80 Freeway Dataset", Next Generation Simulation, NG SIM, Fact Sheet, US Department of Transportation, Federal Highway Administration. Dec. 2006, pp. 1-2.

Anonymous. "Next Generation Simulation (NGSIM)", Traffi c Analysis Tools: Next Generation Simulation—FHWA Operations, https://ops.fhwa.dot.gov/traffi canalysistools/ngsim.htm. Jul. 28, 2021, pp. 1-1.

Anonymous. "Method and System for Providing a Semi-Supervised Learning Mechanism for Optimizing Generation of Autonomous Driving Synthetic Scenarios", ip.com Nov. 12, 2019, pp. 1-3.

Xia, Qin, et al. "Test scenario design for intelligent driving system ensuring coverage and effectiveness", International Journal of Automotive Technology, vol. 19, No. 4. Aug. 2018, pp. 751-758.

Duan, Jianli, et al. "Test scenario generation and optimization technology for intelligent driving systems", IEEE Intelligent Transportation Systems Magazine. Feb. 6, 2020, pp. 1-14.

Mell et al., "The NIST Definition of Cloud Computing", National Institute of Standards and Technology, Special Publication 800-145. Sep. 2011, pp. 1-7.

* cited by examiner

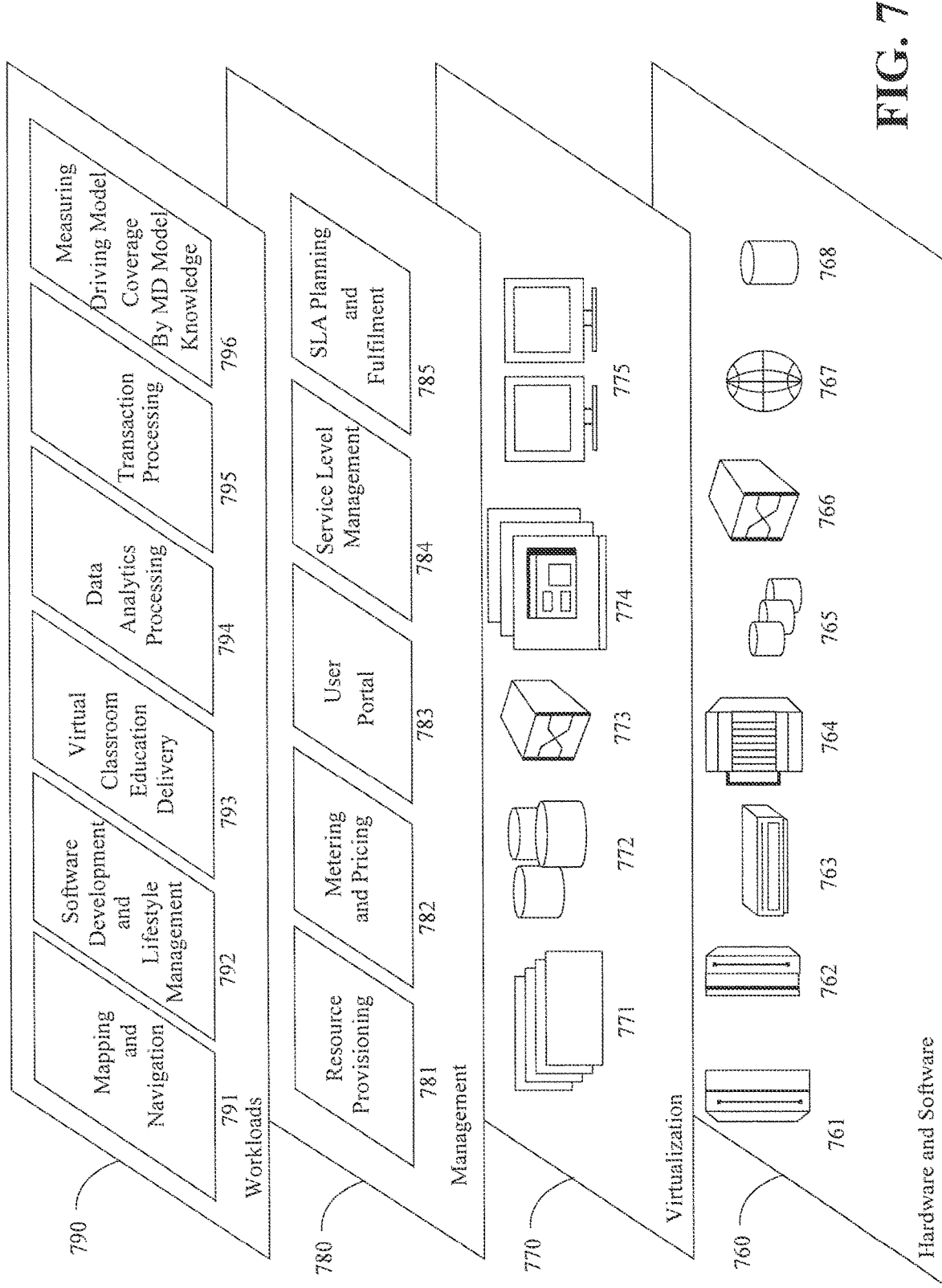

MEASURING DRIVING MODEL COVERAGE BY MICROSCOPE DRIVING MODEL KNOWLEDGE

BACKGROUND

The present invention generally relates to vehicles, and more particularly to a scenario-based method for measuring driving model coverage by Microscope Driving (MD) model knowledge.

Drivers have their own driving styles. Hence, testing Autonomous Driving (AD) with different driving style surrounding cars in the simulation is required before on road testing.

Driving models have been established to represent such driving behavior model. Some testing standards define test scenarios to evaluate system performance. However, the total combination of the test scenarios is huge with many similar scenarios. Hence, there is a need to reduce or eliminate redundancy in the test coverage.

SUMMARY

According to aspects of the present invention, a computer-implemented method is provided for redundancy reduction for driving test scenarios. The method includes receiving an original test set of driving scenarios and a driving model which simulates a vehicle behavior under a driving scenario inputted to the driving model. The method includes, for each driving scenario of the original test set, obtaining vehicle dynamics timeseries data as an output of the driving model. The method includes determining similar driving scenarios by comparing driving model outputs. The method additionally includes creating a new test set of driving scenarios by discarding duplicated ones of the similar driving scenarios from the original test set.

According to other aspects of the present invention, a computer program product is provided for redundancy reduction for driving test scenarios. The computer program product comprising a non-transitory computer readable storage medium having program instructions embodied therewith. The program instructions are executable by a computer to cause the computer to perform a method. The method includes receiving, by a processor device, an original test set of driving scenarios and a driving model which simulates a vehicle behavior under a driving scenario inputted to the driving model. The method further includes, for each driving scenario of the original test set, obtaining by the processor device vehicle dynamics timeseries data as an output of the driving model. The method also includes determining, by the processor device, similar driving scenarios by comparing driving model outputs. The method additionally includes creating, by the processor device, a new test set of driving scenarios by discarding duplicated ones of the similar driving scenarios from the original test set.

According to yet other aspects of the present invention, a computer processing system is provided for redundancy reduction for driving test scenarios. The computer processing system includes a memory device for storing program code. The computer processing system further includes a processor device operatively coupled to the memory device for running the program code to receive an original test set of driving scenarios and a driving model which simulates a vehicle behavior under a driving scenario inputted to the driving model. The processor device further runs the program code to, for each driving scenario of the original test set, obtain vehicle dynamics timeseries data as an output of the driving model. The processor device also runs the program code to determine similar driving scenarios by comparing driving model outputs. The processor device additionally runs the program code to create a new test set of driving scenarios by discarding duplicated ones of the similar driving scenarios from the original test set.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 is a block diagram showing a set of functional abstraction layers provided by a cloud computing environment, in accordance with an embodiment of the present invention.

DETAILED DESCRIPTION

Embodiments of the present invention are directed to a scenario-based method for measuring driving model coverage by Microscope Driving (MD) model knowledge.

Embodiments of the present invention utilize the MD model which has conventionally been used to simply obtain driving data for test scenarios. In accordance with embodiments of the present invention, the MD model is used to determine which test scenarios (tag (weather, road conditions, etc.) and value (sunny, highway, etc.), etc.) represent similar and/or otherwise redundant driving scenarios so that redundant driving scenarios can be removed from the overall data to reduce the overall amount of redundant test scenarios and, hence, also the overall amount of test scenarios.

In an embodiment, the present invention determines which scenarios (tag and value, etc.) represent similar driving by using the MD model. The present invention stores vehicle behavior data from the MD model for each of multiple scenarios. The present invention determines which scenarios represent similar driving by comparing (e.g., using a Dynamic Time Warp or other data comparison method) vehicle dynamics timeseries data. The present invention excludes similar scenarios from the scenario S' to create set S of scenarios (S is actually a subset of S'). In the same way, the present invention excludes similar scenarios from the test scenario T' to create set T of test scenarios (T is actually a subset of T'). The present invention calculates coverage TIS for the number of test scenarios T against the set of scenarios S.

It is to be appreciated that while driver's visibility is used for reducing similar driving scenarios in one or more embodiments of the present invention described herein, the MD model is not limited to driver's visibility and the present invention is not limited to driver's visibility. Lane recognition and road friction are examples relating to driver's visibility. However, the present invention can be used with a myriad of other examples relating or not relating to driver's visibility, depending on the implementation. White lane and yellow lane can be recognized as similar at daytime and in fine weather. By using this similarity of lane recognition, scenarios of lane colors involving white and yellow can be reduced when the time is daytime and the weather is fine in the International Organization of Standardization (ISO) 17361 Lane Departure Warning System (LDWS) as driving scenarios. Braking distances are similar for fine and rain weather, based on road friction research related with driver's visibility. By using this similarity of braking distance from research work, scenarios of fine and rain weather can be reduced when speed of vehicle go down from 60 km/h to 0 km/h in ISO 17361 LDWS scenarios.

Figure 1:
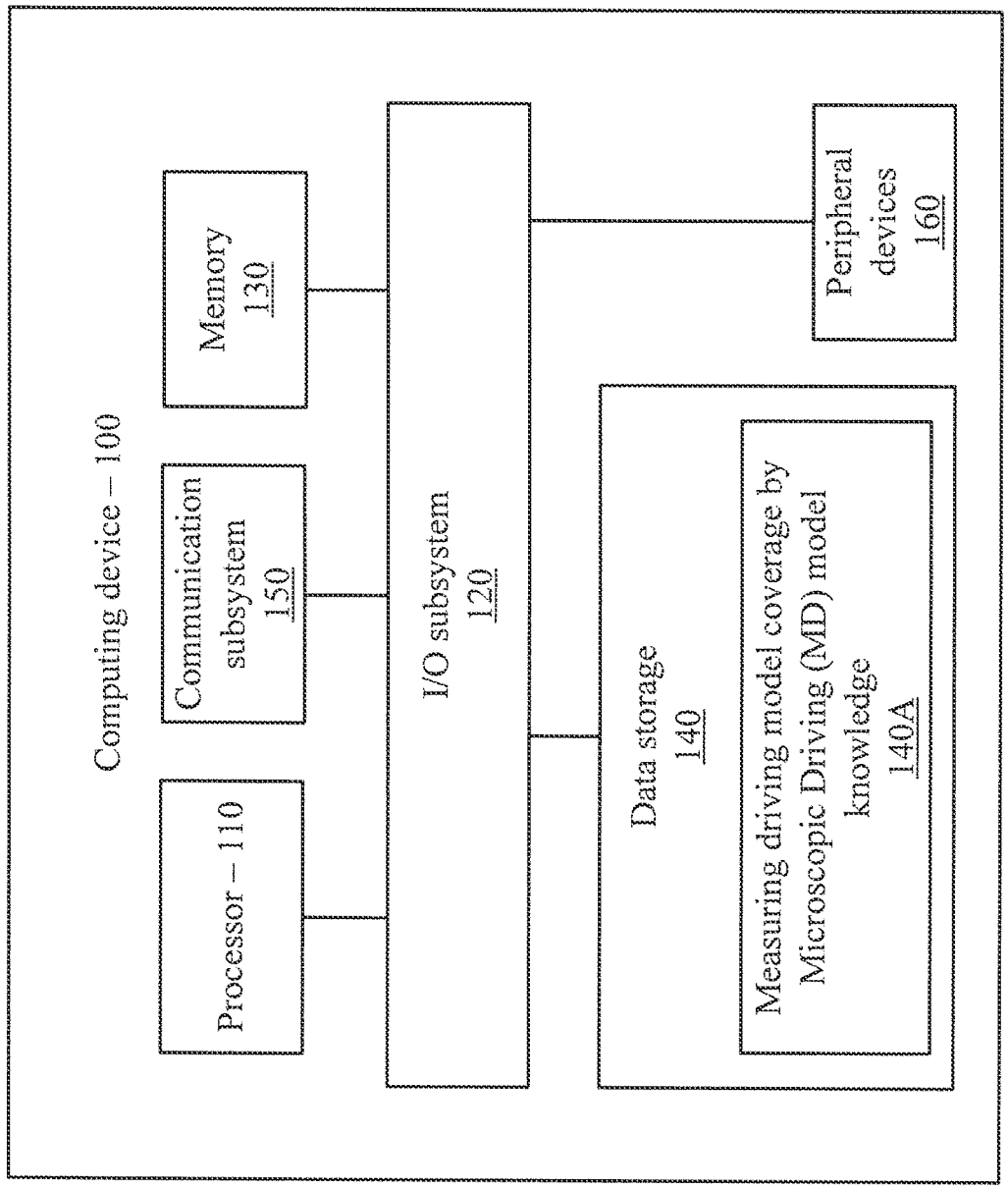
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to measure driving model coverage by Microscope Driving (MD) model knowledge.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for measuring driving model coverage by Microscope Driving (MD) model knowledge. The program code can further be for managing test scenarios for redundancy elimination. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
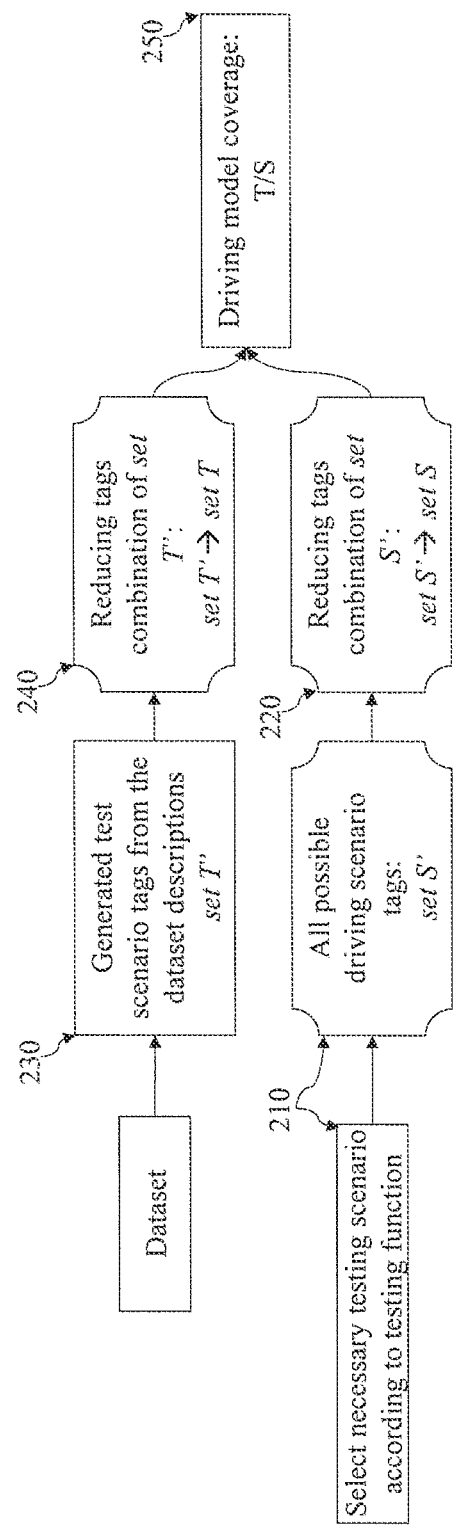
FIG. 2 shows an exemplary method, in accordance with an embodiment of the present invention.

These and other variations of a hardware processor subsystem are also contemplated in accordance with embodiments of the present invention FIG. 2 shows an exemplary method 200, in accordance with an embodiment of the present invention.

At block 210, select a function to be tested and test scenarios needed for testing the selected function from among multiple test scenarios. Each of the test scenarios is described by a tags combination. Exemplary tags can include, but are not limited to, time, weather, road conditions, traffic conditions, visibility, etc.

At block 220, reduce the tags combination describing the test scenarios needed for testing the selected function by Microscope Driving (MD) model knowledge. The MD model suggested that a driver's driving trajectory can be completely determined by his/her visibility, target path, and vehicle dynamics such as, for example, steering, speed, accelerating, braking, and so forth. Visibility is a key factor however in the MD model and the other parameters can be used to determine and/or otherwise estimate visibility as a key factor for determining whether the tags combination result in similar visibility (e.g., within a threshold range). Hence, redundant tags which affect the driver in the same way (e.g., driver moves left to avoid obstacle, driver slows down due to poor/limited visibility (e.g., due to fog, heavy rain, snow, nighttime, curvy road, etc.) are removed from the tags combination. Thus, even when the tags of two tags combinations are different, if they result in a similarity visibility (within a threshold range), it is presumed that they will result in similar driver behavior and one of two tags combinations can be removed as being redundant. Driver's visibilities have been studied under circumstances of weather and road conditions. A tag with "Night: no streetlight"+"Fine" can be removed since the tags of them work the same with "Snow"+"Fine".

At block 230, extract generated test scenario tags from a dataset. The dataset includes tags and values for the tags.

At block 240, reduce the generated test scenario tags by MD model knowledge.

At block 250, calculate the driving model coverage (T/S).

Figure 3:
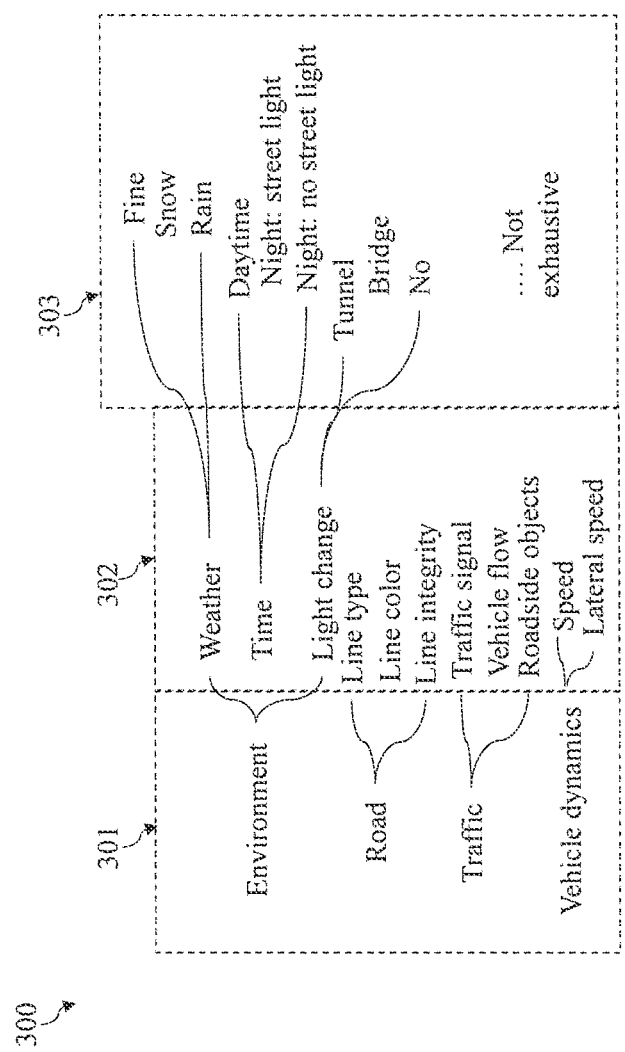
FIG. 3 is a diagram showing all possible scenarios of Lane Departure Warning System (LDWS) tests, in accordance with an embodiment of the present invention.

It is to be appreciated that tags can be multilayered. FIG. 3 is a diagram showing all possible scenarios 300 of Lane Departure Warning System (LDWS) tests, in accordance with an embodiment of the present invention. FIG. 3 corresponds to set S'.

The possible scenarios are presented in a hierarchical format, with a first layer 301, a second layer 302, and a third layer 303, where the third layer 303 includes examples of the second layer 302, and the second layer 302 includes examples of the first layer 301.

Here, for the sake of illustration, the size of set S' is $2^{12} \times 3^5 = 995328$. Presume a 11.1% reduction of S' into set S (995328−110592=884736).

Figure 4:
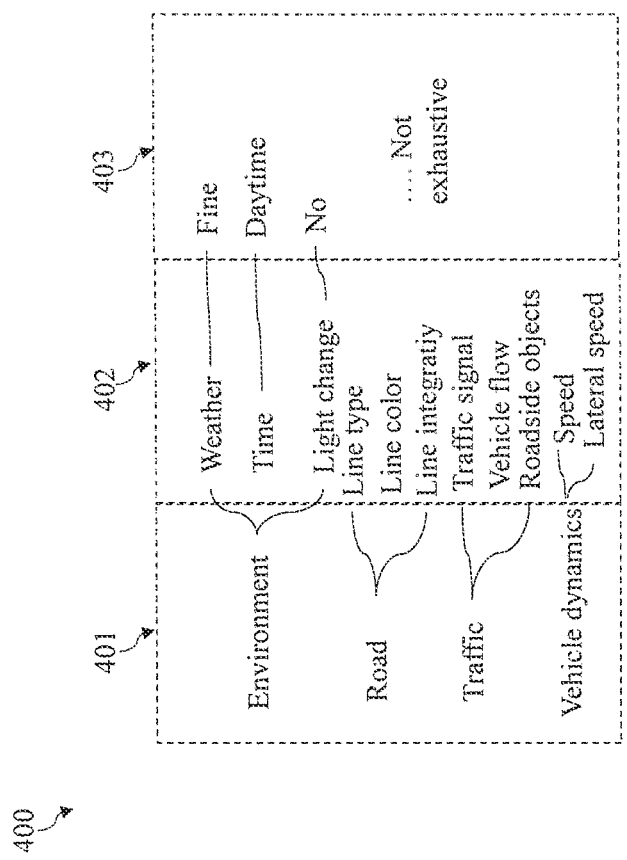
FIG. 4 is a diagram showing tags of a reduced scenario set, in accordance with an embodiment of the present invention.

FIG. 4 is a diagram showing tags 400 of a reduced scenario set, in accordance with an embodiment of the present invention. FIG. 4 corresponds to set T'.

The possible scenarios are presented in a hierarchical format, with a first layer 401, a second layer 402, and a third layer 403, where the third layer 403 includes examples of the second layer 402, and the second layer 402 includes examples of the first layer 401.

Here, for the sake of illustration, the size of set T' is $2^{11} = 2048$. To continue the example, the driving model coverage is calculated as follows:

$$\text{cov} = \frac{2048}{884736} = 0.23\%.$$

What this means is that the driving models generated from the dataset only cover 0.23% of all possible scenarios for testing LDWS function.

Figure 5:
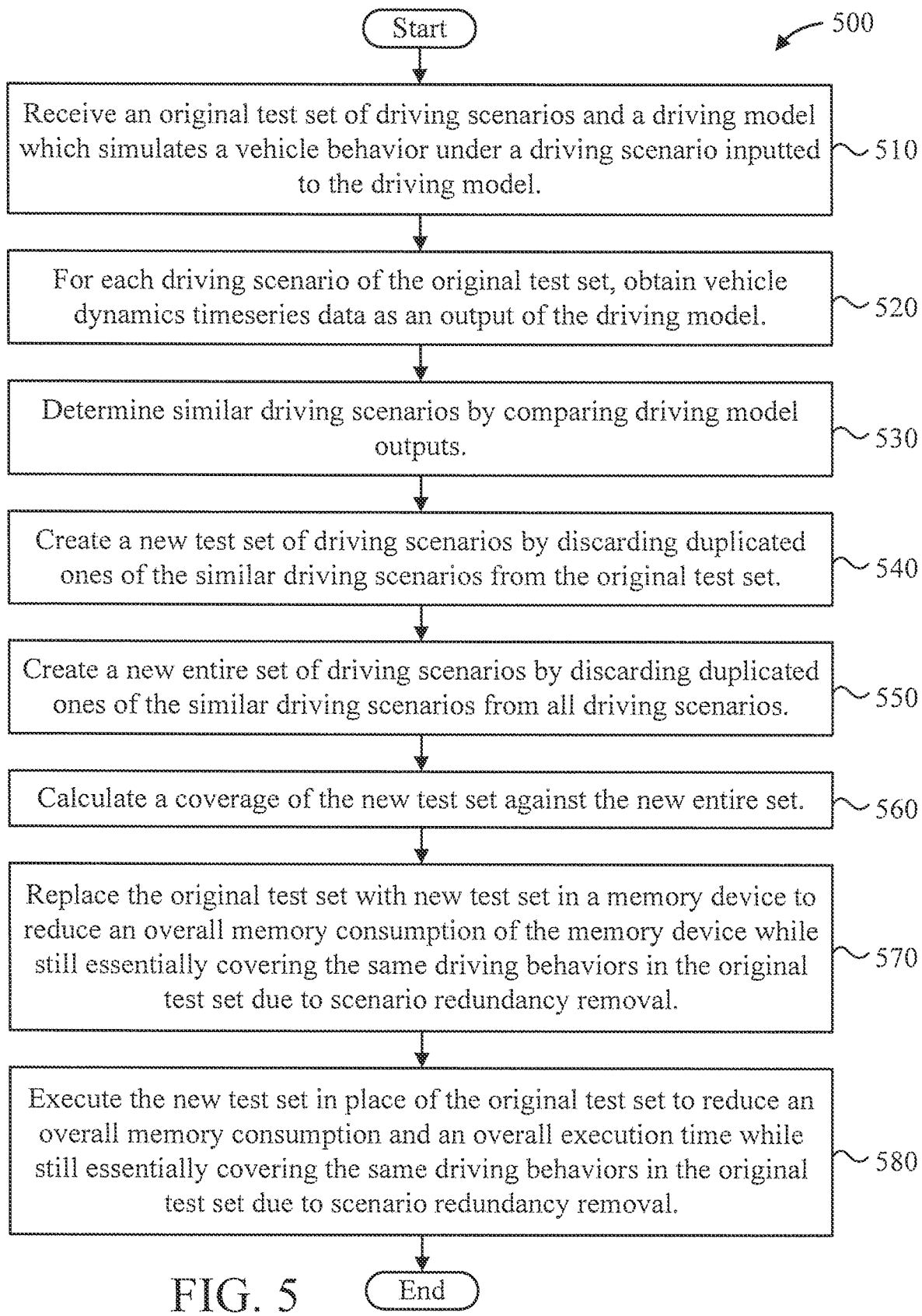
FIG. 5 shows another exemplary method, in accordance with an embodiment of the present invention.

FIG. 5 shows another exemplary method 500, in accordance with an embodiment of the present invention.

At block 510, receive an original test set of driving scenarios and a driving model which simulates a vehicle behavior under a driving scenario inputted to the driving model.

At block 520, for each driving scenario of the original test set, obtain vehicle dynamics timeseries data as an output of the driving model.

At block 530, determine similar driving scenarios by comparing driving model outputs. In an embodiment, the driving model outputs are compared according to a Dynamic Time Warp technique. Of course, the present invention is not limited solely to a Dynamic Time Warp technique for the comparison, and other comparison techniques can also be used in accordance with the teachings of the present invention, while maintaining the spirit of the present invention.

At block 540, create a new test set of driving scenarios by discarding duplicated ones of the similar driving scenarios from the original test set. In this way, scenario redundancy is eliminated and/or otherwise reduced, thus saving memory, testing (execution) time, and so forth.

At block 550, create a new entire set of driving scenarios by discarding duplicated ones of the similar driving scenarios from all driving scenarios. In this way, scenario redundancy is eliminated and/or otherwise reduced, thus saving memory, testing (execution) time, and so forth At block 560, calculate a coverage of the new test set against the new entire set.

At block 570, replace the original test set with new test set in a memory device to reduce an overall memory consumption of the memory device while still essentially covering the same driving behaviors in the original test set due to scenario redundancy removal.

At block 580, execute the new test set in place of the original test set to reduce an overall memory consumption and an overall execution time while still essentially covering the same driving behaviors in the original test set due to scenario redundancy removal.

It is to be appreciated that one or more of the blocks of FIG. 2 and FIG. 5 can be performed in the cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
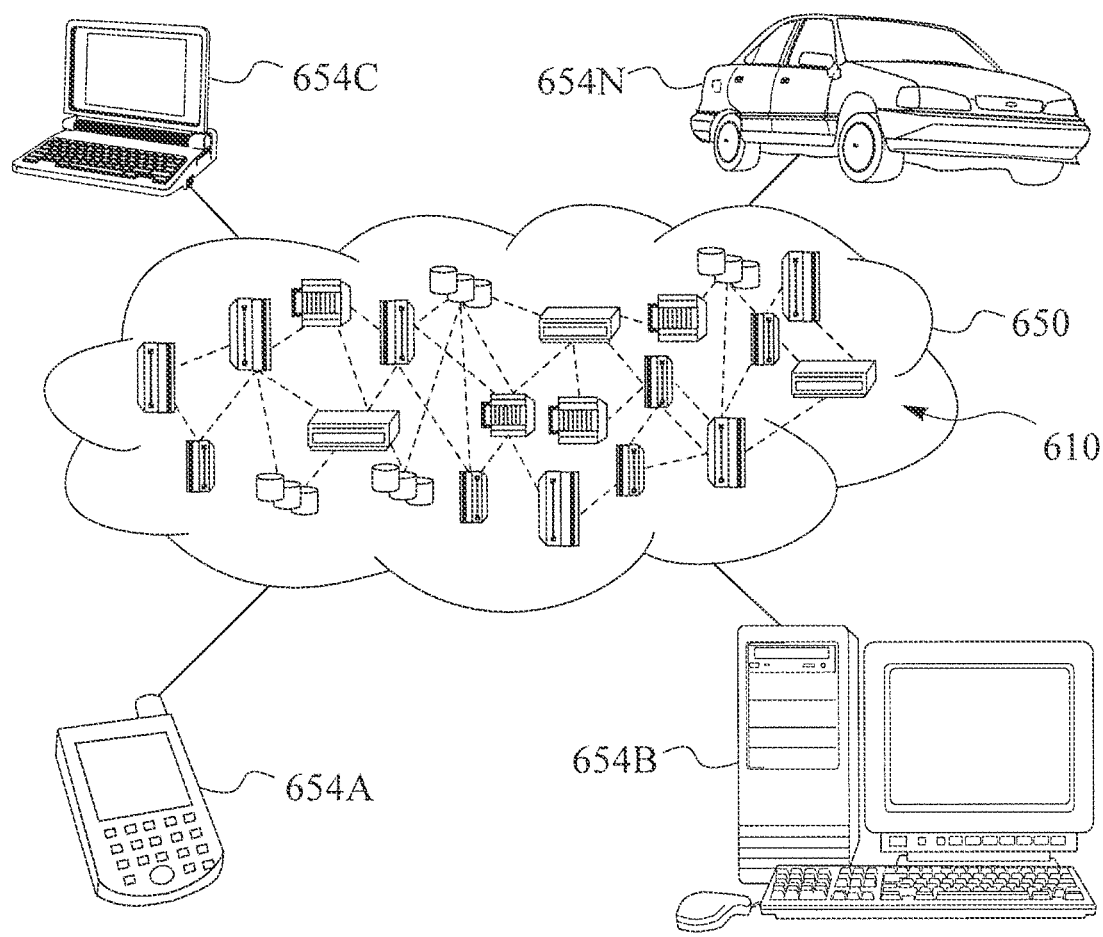
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and measuring driving model coverage by Microscope Driving (MD) model knowledge 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for redundancy reduction for driving test scenarios, comprising:
   receiving an original test set of driving scenarios and a driving model which simulates a vehicle behavior under a driving scenario inputted to the driving model;
   for each driving scenario of the original test set, obtaining vehicle dynamics timeseries data as an output of the driving model;
   determining similar driving scenarios by comparing driving model outputs; and
   creating a new test set of driving scenarios by discarding duplicated ones of the similar driving scenarios from the original test set.

2. The computer-implemented method of claim 1, wherein the driving model outputs are compared according to a Dynamic Time Warp technique.

3. The computer-implemented method of claim 1, further comprising:
   creating a new entire set of driving scenarios by discarding duplicated ones of the similar driving scenarios from all driving scenarios; and
   calculating a coverage of the new test set against the new entire set.

4. The computer-implemented method of claim 3, wherein the new entire set of driving scenarios corresponds to a Lane Departure Warning System standard.

5. The computer-implemented method of claim 1, further comprising replacing the original test set with new test set in a memory device to reduce an overall memory consumption of the memory device while still essentially covering same driving behaviors in the original test set due to scenario redundancy removal.

6. The computer-implemented method of claim 1, further comprising executing the new test set in place of the original test set to reduce an overall memory consumption and an overall execution time while still essentially covering same driving behaviors in the original test set due to scenario redundancy removal.

7. The computer-implemented method of claim 1, wherein the original test set comprises a plurality of tag-value pairs, each of the plurality of tag-value pairs comprising a tag for a specific topic of interest and a value corresponding to the specific topic of interest.

8. The computer-implemented method of claim 7, wherein the plurality of tag-value pairs comprise at least time of day tags and road condition tags.

9. The computer-implemented method of claim 1, wherein the driving model uses a driver visibility as a main factor for determining the driving behaviors, the driver visibility being calculated from values of two or more tags in the original test set comprising at least weather tags and road condition tags.

10. A computer program product for redundancy reduction for driving test scenarios, the computer program product comprising a non-transitory computer readable storage medium having program instructions embodied therewith, the program instructions executable by a computer to cause the computer to perform a method comprising:

receiving, by a processor device, an original test set of driving scenarios and a driving model which simulates a vehicle behavior under a driving scenario inputted to the driving model;

for each driving scenario of the original test set, obtaining by the processor device vehicle dynamics timeseries data as an output of the driving model;

determining, by the processor device, similar driving scenarios by comparing driving model outputs; and creating, by the processor device, a new test set of driving scenarios by discarding duplicated ones of the similar driving scenarios from the original test set.

11. The computer program product of claim 10, wherein the driving model outputs are compared according to a Dynamic Time Warp technique.

12. The computer program product of claim 10, further comprising:

creating a new entire set of driving scenarios by discarding duplicated ones of the similar driving scenarios from all driving scenarios; and calculating a coverage of the new test set against the new entire set.

13. The computer program product of claim 12, wherein the new entire set of driving scenarios corresponds to a Lane Departure Warning System standard.

14. The computer program product of claim 10, further comprising replacing the original test set with new test set in a memory device to reduce an overall memory consumption of the memory device while still essentially covering same driving behaviors in the original test set due to scenario redundancy removal.

15. The computer program product of claim 10, further comprising executing the new test set in place of the original test set to reduce an overall memory consumption and an overall execution time while still essentially covering same driving behaviors in the original test set due to scenario redundancy removal.

16. The computer program product of claim 10, wherein the original test set comprises a plurality of tag-value pairs, each of the plurality of tag-value pairs comprising a tag for a specific topic of interest and a value corresponding to the specific topic of interest.

17. The computer program product of claim 16, wherein the plurality of tag-value pairs comprise at least time of day tags and road condition tags.

18. The computer program product of claim 10, wherein the driving model uses a driver visibility as a main factor for determining the driving behaviors, the driver visibility being calculated from values of two or more tags in the original test set comprising at least weather tags and road condition tags.

19. A computer processing system for redundancy reduction for driving test scenarios, comprising:

a memory device for storing program code; and a processor device operatively coupled to the memory device for running the program code to:

receive an original test set of driving scenarios and a driving model which simulates a vehicle behavior under a driving scenario inputted to the driving model;

for each driving scenario of the original test set, obtain vehicle dynamics timeseries data as an output of the driving model;

determine similar driving scenarios by comparing driving model outputs; and create a new test set of driving scenarios by discarding duplicated ones of the similar driving scenarios from the original test set.

20. The computer processing system of claim 19, wherein the driving model outputs are compared according to a Dynamic Time Warp technique.

* * * * *